United States Patent [19]

Sexton, Jr.

[11] Patent Number: 4,724,606

[45] Date of Patent: Feb. 16, 1988

[54] METHOD AND APPARATUS FOR MAKING A SUBMINIATURE FUSE

[75] Inventor: William F. Sexton, Jr., Porter, Ind.

[73] Assignee: Littelfuse, Inc., Des Plaines, Ill.

[21] Appl. No.: 941,050

[22] Filed: Dec. 19, 1986

[51] Int. Cl.⁴ ....................... H01H 69/02; B23P 19/00

[52] U.S. Cl. .................................... 29/623; 29/33 M; 29/33 K; 29/564.8; 29/756; 29/759; 83/440; 83/566; 337/252

[58] Field of Search ....................... 29/623, 756, 564.8, 29/33 M, 33 K, 563, 56.6, 759; 337/252; 83/440, 440.1, 566–570

[56] References Cited

U.S. PATENT DOCUMENTS

| | | | |
|---|---|---|---|
| 2,046,669 | 7/1936 | Wood | 29/756 |
| 2,592,019 | 4/1952 | Farnett | 83/500 |
| 2,929,289 | 3/1960 | Gorecki | 140/71 R |
| 3,414,959 | 12/1968 | Konazewski et al. | 29/759 |
| 3,636,806 | 1/1972 | Vyncke | 83/440 |

FOREIGN PATENT DOCUMENTS

| | | | |
|---|---|---|---|
| 47909 | 9/1979 | U.S.S.R. | 29/623 |

*Primary Examiner*—P. W. Echols

*Attorney, Agent, or Firm*—Russell E. Hattis; Stephen R. Arnold

[57] ABSTRACT

A method for assembling terminal cup-shaped end caps over the ends of cartridge-type electrical subminiature fuses during the assembly thereof has for its novel feature the provision of a centered axially extending handling wire attached to the outer face of each end cap prior to the assembly process. By configuring the lengths of the handling wires substantially longer than the dimensions of the cap itself, the use of an alignment fixture employing the wires for handling and alignment purposes allows for precise orientation of the end caps during the press-on assembly process over the ends of the fuse body. After assembly the wires are removed from their respective end caps. A shearing station suitable for mass production lead removal has upwardly extending sheraing blades with the fuses passed sequentially past the blades with their leads extending slightly over the top of the blade cutting edges. Axial pressure forces the end caps into abutting relationship with the blades, whereupon a movable piston engages the fuse body to force the wires in a shearing direction across the blade edges to result in a burr-free removal.

17 Claims, 11 Drawing Figures

METHOD AND APPARATUS FOR MAKING A SUBMINIATURE FUSE

DESCRIPTION

TECHNICAL FIELD

The technical field of the instant application is the electrical circuit breaking art, and in particular the electrical fuse art.

BACKGROUND OF THE INVENTION

The demand for high component density on contemporary printed circuit boards, particularly in the case of boards designed for computer applications, has resulted in a substantial effort directed towards the miniaturization and subminiaturization of discrete electrical components mounted on such boards. In the case of conventional components, such as resistors and capacitors, such elements, once installed by soldering, are essentially permanent, requiring removal from the circuit board only in the event of component failure. This happens only rarely; however, subminiature fuses are also mounted on such boards, and their occasional replacement is to be expected.

Prior to the present invention, fuses used on printed circuit boards had flexible leads or had rigid plug-in terminals which were plugged into sockets and anchored therein by solder. Where they had flexible leads, they were either soldered to terminals on the board or were bent into a parallel confronting relationship and plugged into socket terminals in the printed circuit board.

Surface mounting of electrical components, like capacitory resistors, but not fuses, in printed circuit boards is becoming popular. These components are provided with terminals on the bottom surfaces thereof, which are placed into facial contact with terminal pad areas on the printed circuit boards. Cylindrical fuses with cylindrical end caps have not heretofore been surface mounted or clip-mounted on printed circuit boards since the leads of these fuses presumed that they could not be so mounted.

The present invention was developed to mass produce a new type of subminiature cylindrical cartridge fuse where the fuse has no leads and so is more compact than the cartridge fuses heretofore used on printed circuit boards, and can be surface mounted on terminal pads or received clips on the circuit board. The cup-shaped end caps of these fuses can be received in terminal clips or are seated on terminal pads on the printed circuit board and soldered thereto.

In the normal course of manufacture of larger cartridge fuses, a fuse filament is mounted within an insulating tube and folded over the outer ends thereof, whereupon the generally cup-shaped conducting terminal-forming end caps are pressed over the ends of the tubes to anchor the fuse element in place, at the same time making electrical contact thereto. A subsequent heating operation causes a solder bonding of the ends of the fuse element to pre-tinned interior regions of the terminal caps, completing the assembly. In the case of cartridge fuses previously so made, such assembly operations are relatively easy and straightforward. In the case of subminiature fuses which are to have leadless end caps of a diameter on the order of 0.075 inches, the problem of orienting the end caps prior to press-on assembly over the ends by automatic machinery has proven to pose a formidable problem.

There remains a need for a simple and inexpensive way of orienting and aligning such subminiature end cap terminals during the assembly process, and in particular there remains a need for such a method which is compatible with automatic fabrication techniques. To the applicant's knowledge, to date there has been no satisfactory method for accomplishing this in a reliable and inexpensive way.

SUMMARY OF THE INVENTION

According to a feature of the invention as reflected in method claims, the end cap terminals for subminiature cylindical cartridge-type fuses are prefabricated with a centrally disposed temporary self-supporting handling filament, preferably in the form of a metallic wire, extending axially outward from the major outer face thereof. Such wires are preferably substantially longer than the major dimensions of the fuse caps. These wires proved to be effective means for handling the fuse caps, and are used in conjunction with suitable engaging and guiding means to orient the fuse caps before pressing them into place. Both caps are preferably pressed into engagement simultaneously. By unique means forming another aspect of the present invention, wherein the handling wires are subsequently removed, the wires are sheared in such a way that no wire stubs extend beyond the outer major faces of the end caps. Such stubs could interfere with an end face engaging mounting clip. It is found that by providing such handling wires to facilitate the assembly phase of manufacturing, a substantial reduction in the number of damaged or otherwise defectively assembled fuses is achieved.

According to a related but independent aspect of the invention, a shearing station is provided for removing the handling wires, the fuse being positioned by a carrier on a vertically displaceable cradle to confront one face of a preferably stationary shearing blade, the fuse wire extending immediately over a sharp edge at the top thereof. Axial pressing means preferaly in the form of a piston carrying a similarly configured shearing blade then engage the opposite end of the fuse to force the confronting end caps into contact with the confronting surfaces of the shearing blades. A vertically descending piston, preferably contacting both fuse end caps, engages the fuse to force the leads downward across the sharp (apex) edges of the blades, resulting in stubless end faces. The shearing blades are configured to provide additional support to portions of the fuse faces above the handling wires during the shearing operation.

Other features and aspects of the invention will become apparent upon making reference to the specification, claims, and drawings to follow.

DESCRIPTION OF THE INVENTION

Figure 1:
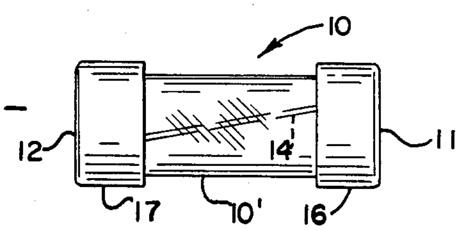
FIG. 1 is a front view of a cartridge fuse.
Figure 2:
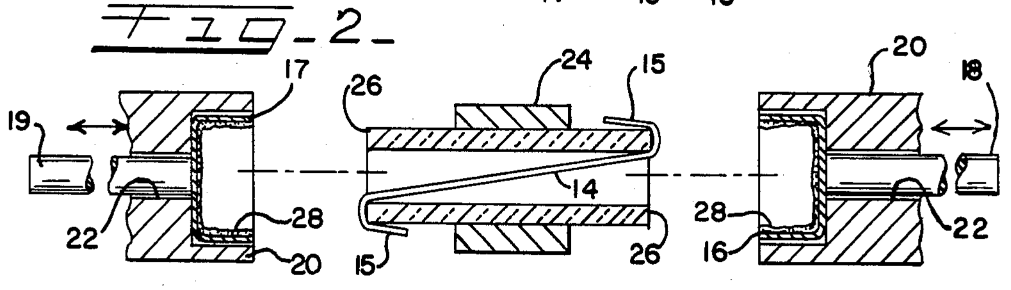
FIG. 2 is an exploded view showing an assembly phase of the fuse of FIG. 1 showing a fuse body and a pair of fuse terminal caps orientingly positioned for assembly by means of integral handling wires.

FIG. 2 shows the first step of a method whereby the subminiature fuse of the type shown in FIG. 1 can readily be fabricated. The finished fuse 10 consists of a cylindrical fuse body 10' of glass or other insulating material and having disposed in an axial bore therein a fusewire 14. The fusewire 14 is captively secured by cup-shaped conducting end caps 16,17 having flat leadless end faces 11,12. In FIG. 2 it will be seen that the fuse body 10', having the fusewire 14 extending diagonally across the bore thereof and held in place by crimped-over ends, is positioned by body carrier 24. The body carrier 24 may take a variety of designs, and in the method described herein need merely provide reasonable aligning support to the fuse body 12 during this phase of assembly. Most preferably, the body carrier 24 would be part of a continuous conveyor system automatically conveying such fuse bodies into position for cap assembly, and thereafter to subsequent stations for final processing. In the method shown in FIG. 2, body carrier 24 is positioned to place the fuse body 10 in axial alignment with a pair of recessed cap handlers 20,20.

The cup-shaped end caps 16,17, having a typical diameter of 0.075 inches, are provided with centrally disposed self-supporting handling filaments 18,19, most preferably in the form of metallic wires extending from the center of the end faces 11 of the terminal end caps 16,17. The handling filaments 18,19 are chosen to be substantially longer than the major dimensions of their associated end caps 16,17, so that the wire-receiving bores 22 axially disposed in the recessed cap handlers 20,20 serve to align the end caps 16,17 with the axis of the fuse body 12. The wires are preferably of a diameter of 0.025 inches. With the recessed cap handlers 20,20 thus preloaded (by means not shown), the recessed cap handlers 20,20 are driven towards each other (by means not shown) so as to force their respectively carried end caps 16,17 into final seated position over the fuseholder body 12 to produce the general configuration shown in FIG. 1, but still having the handling filaments 18,19 attached.

A subsequent mutual retraction of the recessed cap handlers 20,20 sufficient to disengage completely from the handling filaments 18,19 allows the body carrier 24 to be moved laterally to the next processing station, most typically a heating station where the pre-tinned solder films 28-28 inside the end caps 16,17 are momentarily melted to secure positive electrical contact to the ends 15-15 of the fusewire 14. The handling filaments 18,19 are subsequently removed from the end faces 11,12 of the end caps 16,17, most preferably by a shearing operation conducted immediately at the junctures therebetween.

The recessed cap handlers 20,20 may take a great variety of forms, and need not take the form of recessed pistons having wire-accommodating axial bores as shown, but may alternatively take the form of movable jaws, V-groove carrier strips, or a great many other readily loaded structures which will be evident to those of ordinary skill in the art. Once the handling filaments 18,19 have been removed, the desired structure as shown in FIG. 1 is achieved.

Figure 3:
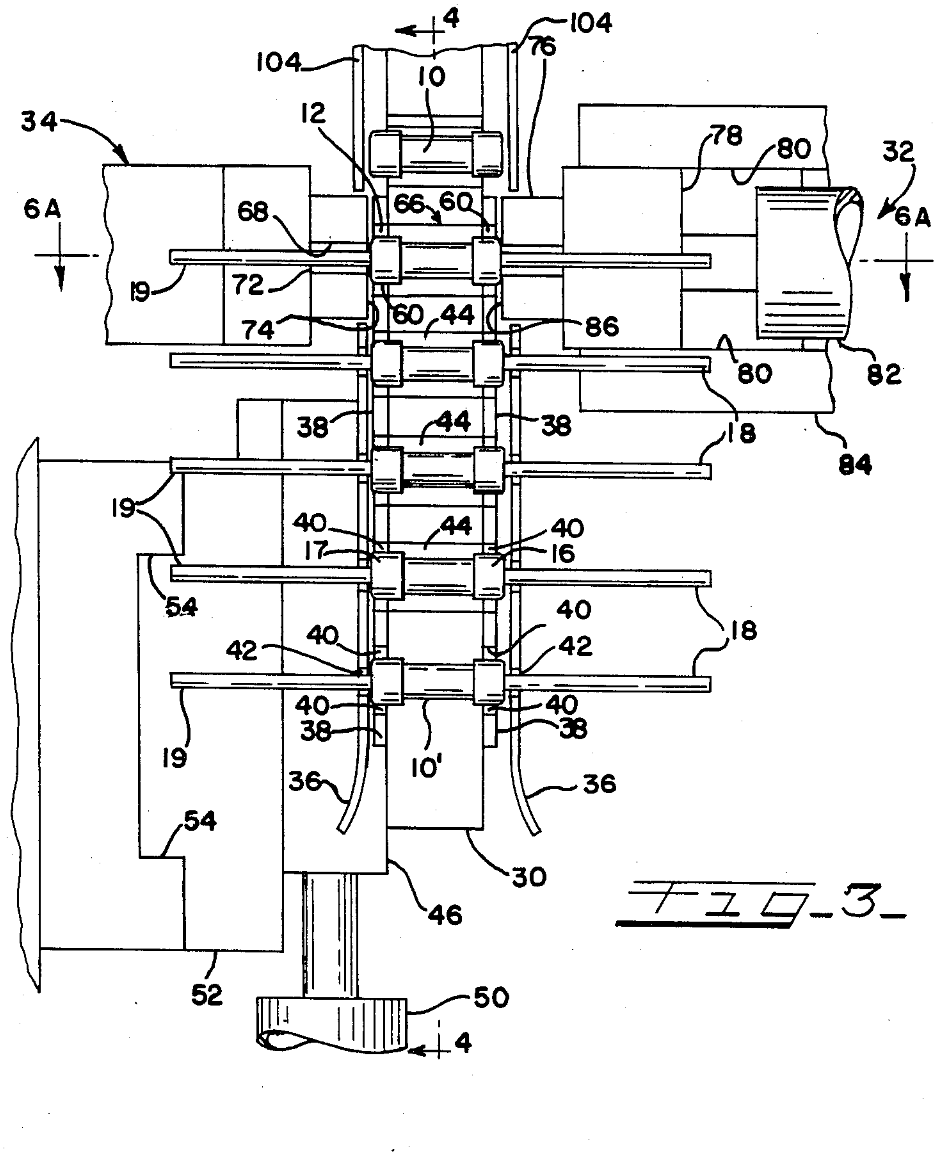
FIG. 3 is a plan view of a pair of shearing systems used for automatic removal of the handling wires.
Figure 4:
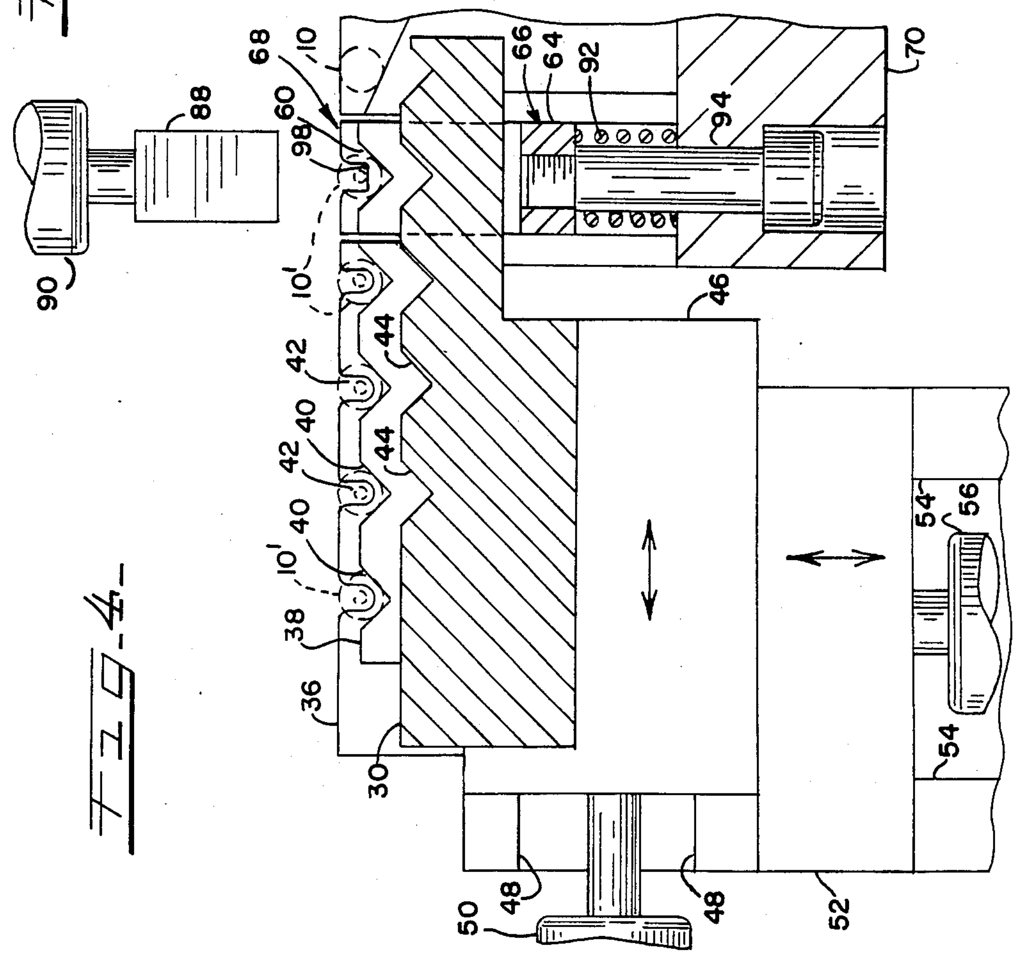
FIG. 4 is a partial cross-section view of the stations of FIG. 3 along the section lines indicated in FIG. 3, with certain rear details of FIG. 3 omitted.

FIGS. 3–7 show a shearing system designed for automatic removal of the handling filaments 18,19 on a mass production basis. Lead-bearing fuses 10'-10' are sequentially loaded onto a fuse carrier 30 to be advanced towards a pair of confronting shearing stations 32,34. The fuses 10'-10' are loaded by conventional means (not shown) so as to be laterally confined between interior confronting faces of generally planar parallel fixedly supported guide rails 36-36. FIG. 4 and detail FIGS. 5A–5C show details of the system whereby the fuses are advanced towards and past the shearing stations 32,34. Parallel to and immediately inboard of each of the guide rails 36,36 are a pair of fixedly supported generally planar end support rails 38,38 configured with a number of V-grooves 40 in the top edges thereof. These support rail V-grooves 40 support the fuses 10' by engagement with their end caps 16,17. Wire clearance notches 42-42 in the top edges of the guide rails 36,36 are positioned so that with a fuse thus supported on the end support rails 38,38 passage of the fuse leads 18,19 therethrough is accommodated.

Figure 5A:
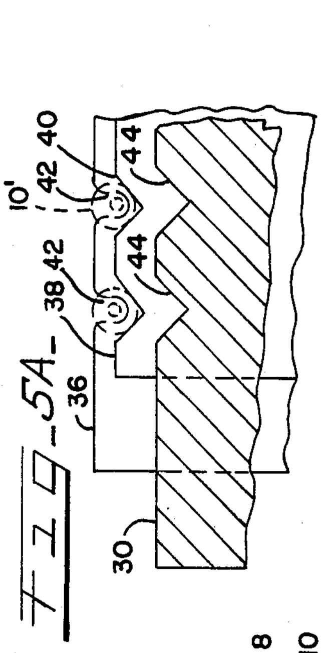
FIGS. 5A–5C are detail views of a portion of FIG. 4 showing how coupled reciprocating motion of a fuse body carrier advances the fuses through the system shown in FIG. 3.
Figure 5B:
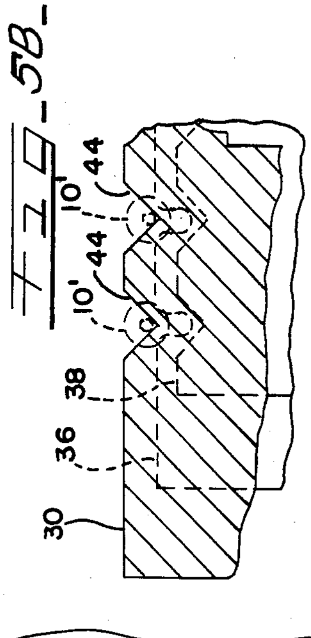
Figure 5C:
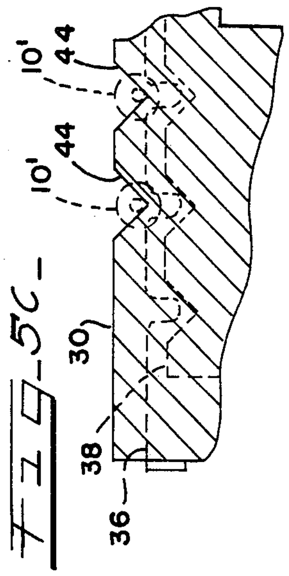

FIGS. 5A–5C show the detailed sequence whereby the fuses 10' are sequentially advanced along the support rails 38-38 to the shearing stations 32,34. The fuse carrier 30 is generally bar-shaped, having V-grooves 44-44 at the carrier upper surface and disposed along the length thereof, the carrier being affixed to a translation table 46 mounted on ways 48,48. This table in turn is reciprocally movable in an advancing and a retracting direction, i.e., left and right as seen in FIG. 4, by means of a bidirectionally actuatable translation piston 50 governed by conventional drive and timing means (not shown). The translation table 46 is in turn slidably mounted on a lifting table 52 mounted on vertically oriented ways 54,54 and similarly actuated by a cyclically actuated lifting piston 56 so as to be raised and lowered at controlled intervals.

The fuse advancing operation is initiated with the fuse carrier 30 in its lowermost leftward position as shown in FIG. 5A. The lift piston 56 is then energized to raise the fuse carrier 30, thereby raising the fuses 10'-10' to a point where their end wires 18,19 are above the tops of the end support rails 38-38 (FIG. 5B). Next, with the carrier 30 still in the raised position, the translation piston 50 is actuated to move the fuse carrier 30 forward, i.e., to the right in FIGS. 4, 5A–5C, to position each fuse 10' immediately above the next sequential pair of support V-grooves 40-40 in the support rails 38-38 (FIG. 5C). Dropping the lifting table 52 then causes each fuse 10'-10' to settle into engagement with, and to be supported by, the support rail V-grooves 40-40 at the next position therealong. The carrier 30 at this point is as shown in FIG. 4.

Figure 6A:
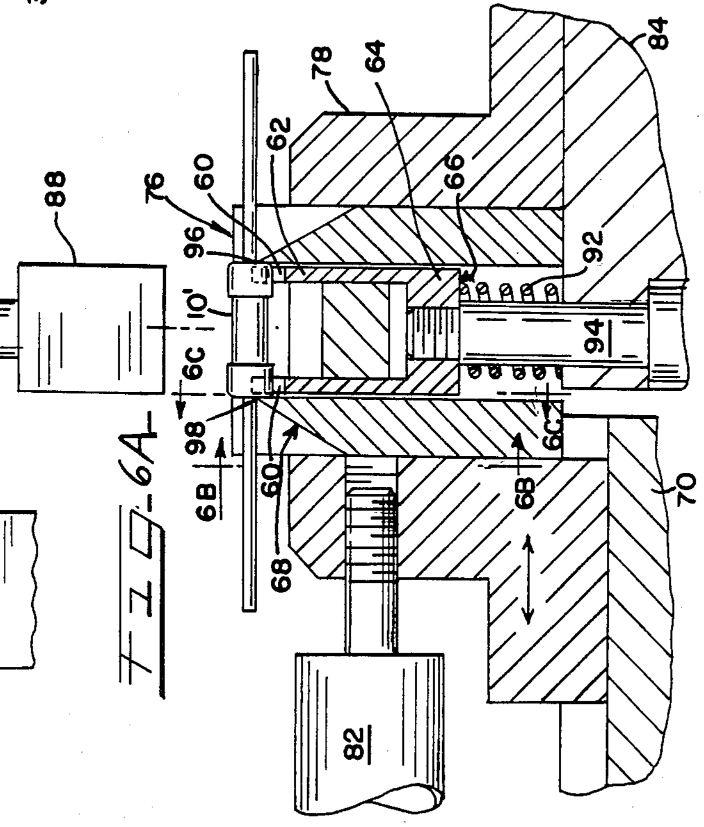
FIG. 6A is a partial cutaway view of the lead shearing system shown in FIG. 3 along the cut lines indicated therein.
Figure 6C:
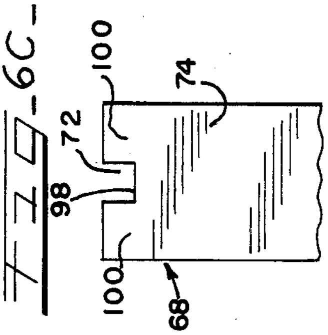
FIGS. 6B–6C are detail views of one of the shearing blades shown in FIG. 6A.
Figure 6B:
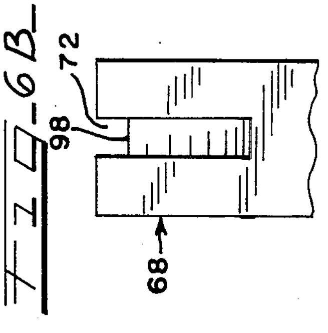

For lead removal the fuses are thus transported to be sequentially deposited upon the V-shaped jaws 60,60 of support rails 62,62 extending upwards from a joining yoke 64 to form a shearing cradle 66. The shearing cradle 66 is shown in FIG. 6A. It will be noted that the fuse carrier 30 is fully movable within and between the support rails 62 of the shearing cradle 66. The left shearing station 34 includes a vertically extending left shearing blade 68 affixed to the frame 70 of the system, the shearing blade having a lead accommodation groove 72 passing therethrough and through which the fusewire 19 extends. The left shearing blade 68 is preferably configured with a planar interior abutment face 74 facing the left end cap 12 of the emplaced fuse. This interior abutment face 74 is aligned (FIG. 3) in prolongation of the interior face of its adjoining guide rail 36 so that during transfer of the fuse to its shearing position leftward lateral restriction of fuse travel is maintained.

The right shearing station 32 is provided with a right shearing blade 76 similarly configured, but mounted on a backing member 78, the backing member 78 being slidably mounted on ways 80,80 mounted on a positioning table 84 so that the right shearing blade can be withdrawn to the right or moved to the left by actuation of a positioning piston 82. In FIG. 3 the right shearing blade 76 is shown in the extended position; however, during the loading operation of the shearing station the blade 76 is withdrawn so that the abutment face 86 thereof lies in general prolongation with its associated guide rail 36.

Each shearing blade 68,76 is generally configured as a generally upstanding rectangular block having a downwardly and outwardly extending groove machined therein. With particular attention to the left shearing blade 68, the resulting structure has a sharp cutting apex 98 (see also FIGS. 6B, 6C for details) having a lead accommodation groove 72 formed therein, the planar abutment interior faces 74 thus having planar extension portions 100,100 on either side of the sharp apex 98. With the fuse 10' emplaced between the two shearing stations 32,34 (FIG. 3), the positioning piston 82 is energized to drive the right shearing blade 76 to the left, thereby compressing the fuse 10' between the interior abutment faces 74,86 of the left shearing blade 68 and the right shearing blade 76 respectively.

Figure 7:
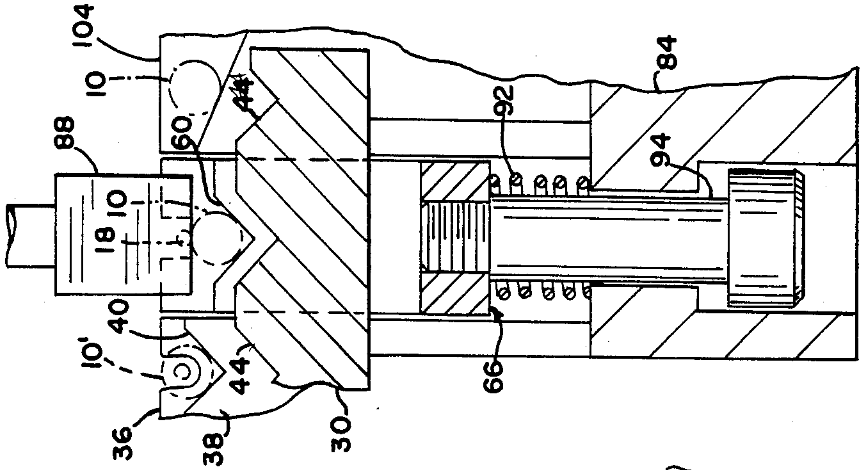
FIG. 7 is a detail view of a portion of FIG. 4 showing the shearing action of a shearing piston forcing an emplaced fuse downward against a spring-loaded shearing cradle to remove the leads.

With the fuse 10' so loaded in position, a shearing piston 88 (FIGS. 4, 6A, 7) reciprocally powered by an actuator 90 is driven downward to contact the fuse end caps 16,17, thereby forcing the fuse 10' and the shearing cradle 66 downward against the force of a shearing cradle spring 92. Guidance to the shearing cradle during this process is provided by an attached guiding piston 94 slidingly affixed to the positioning piston support table 84. The fuse end leads 18,19 are thus forced across the sharp apexes 98,98 of the shearing blades 68,76, causing the end leads to be cleanly removed (FIG. 7). The result is an almost completely burr-free removal of the handling wires 18,19.

After shearing, the shearing piston 88 is withdrawn upward to the position shown in FIG. 4, and the shearing cradle 66 rises to the limiting position shown. A subsequent actuation of the carrier 30 through an advancing cycle lifts the fuse 10' out of the shearing cradle 66 to be advanced and deposited onto a dispensing chute defined by generally confronting chute walls 104,104 for delivery to the next manufacturing station.

Thus, the handling leads which make practicable the emplacement of subminiature end caps on the fuse body by procedures adaptable to automatic assembly stations may similarly be cleanly removed by a pair of shearing stations as described above to produce a combined manufacturing process which may be completely automated.

The present system maintains the shear blades in a stationary position, which allows the fuse to be located tightly against the blades. The stationary shear blade is thus used as a locator, and both blades are always flush to the cutting surface. By maintaining the blades flush to the cutting surfaces, the cut-off burr is cleanly eliminated regardless of overall part length. Although the above-described system provides for simultaneous lead removal, it is evident that, if desired, the leads may be sequentially removed by a pair of stations by a relatively straightforward modification of the apparatus described hereinabove.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. A method for making a miniature electrical cartridge-type fuse having an open-ended insulating housing in which a fuse element is disposed and at the ends of which a pair of fuse terminal caps are emplaced to make electrical contact to the ends of said fuse element, each cap having a major leadless exterior end face, the improvement comprising:

providing a self-supporting handling filament on said major face of each said caps and disposed so as to extend axially away therefrom;

engaging said filaments so as to aligningly orient said end caps with respect to said housing and mounting said caps at the ends of said housing; and removing said filaments from said major faces after the emplacement of said caps at said ends of said housing.

2. The method of claim 1 wherein said filaments are removed by shearing them away at their points of juncture with said major faces.

3. The method of claim 2 wherein said step of filament removal includes emplacing said fuse on carrier means for transporting said fuses to a shearing apparatus supported on a base and having a pair of shearing blade means each having a shearing wedge portion terminating at an apex, one face of each of said shearing wedge portions being configured as an abutment face for engagement with one of the end faces of one of said terminal caps, said carrier means being disposed to aligningly position said fuse so that said end faces confront at least a portion of said abutment faces of said shearing wedges and so that said filaments extend beyond said apexes, said shearing apparatus including axially movable pressing means for forcing said end faces of said terminal caps and said abutment faces of said shearing wedges into abutting contact, and transversely movable pressing means for causing relative movement between said fuse and said shearing blades in a shearing direction so as to force said filaments onto said shearing wedge apexes to be cut from said end faces at the point of juncture of said end faces and said filaments, and operating said axially movable pressing means to force said terminal cap end faces into said abutting contact and operating said transversely movable pressing means to shear said filaments.

4. The method of claim 3 wherein at least one of said shearing wedges is provided with a pair of abutment face extension portions and disposed on either side of its associated wedge apex to extend therebeyond and configured so as to provide additional confronting area for engaging an opposing terminal cap end face with the filament associated therewith disposed extending between said extension portions.

5. The method of claim 4 wherein both of said shearing wedges are provided with such abutment face extension portions.

6. The method of claim 5 wherein during shearing said shearing blade is maintained fixed in relation to said base, said carrier means includes support means which is movable in said shearing direction, and said transverse pressing means includes at least one fuse-engaging movable piston which is moved to urge said fuse and thereby said support means in said shearing direction to remove said filaments.

7. The method of claim 6 wherein said shearing blades extend upward from said base, and said shearing direction is downwards towards said base.

8. The method of claim 7 wherein said carrier means moves a fuse loaded thereon in a direction generally parallel to the apex lines of said shearing wedges so as to move said terminal cap end faces to confront said abutment faces of said shearing wedges.

9. The method of claims 1, 2, 3, 4, 5, 6, 7 or 8 wherein both of said filaments are removed simultaneously.

10. The method of claims 3, 4, 5, 6, 7 or 8 wherein both of said filaments are removed simultaneously, and said axial pressing means is provided with one of said shearing blade means thereon to force said terminal cap end faces of said fuse into simultaneous abutting contact with said abutment faces of said shearing blade means prior to operation of said transverse pressing means.

11. A shearing apparatus for removing self-supporting filaments extending axially from the opposite end faces of a fuse comprising: an apparatus mounting base a pair of shearing blade means each having a shearing wedge portion terminating at an apex, one face of each of said shearing wedge portions being an abutment face for engagement with one of said terminal cap end faces;

carrier means for aligningly positioning said fuse so that said end faces confront at least a portion of said abutment faces of said shearing wedges and so that said filaments extend beyond said apexes;

axially movable pressing means for forcing said terminal cap end faces and said abutment faces of said shearing wedges into abutting contact; and releasable transversely movable pressing means for causing relative movement between said fuse and said shearing blades in a shearing direction so as to force said filaments onto said shearing wedge apexes to be cut from said end faces at the point of juncture of said terminal cap end faces and said filaments.

12. The apparatus of claim 11 wherein at least one of said shearing wedges is provided with a pair of abutment face extension portions disposed on either side of its associated wedge apex to extend therebeyond and configured so as to provide additional confronting area for engaging an opposing terminal cap end face with the filament associated therewith disposed extending between said extension portions.

13. The apparatus of claim 12 wherein both of said shearing wedges are provided with such abutment face extension portions.

14. The apparatus of claim 11 wherein during shearing said shearing blade is maintained fixed in relation to said base, said carrier means includes support means movable in said shearing direction, and said transversely movable pressing means includes at least one fuse-engaging movable piston disposed to urge said fuse and thereby said carriage means in said shearing direction to remove said filaments.

15. The apparatus of claim 14 wherein said shearing blades extend upward from said base, and said shearing direction is downwards towards said base.

16. The apparatus of claim 15 wherein said carrier means is disposed to move a fuse loaded thereon in a direction generally parallel to the apex lines of said shearing wedges so as to move said fuse end faces to confront said abutment faces of said shearing wedges.

17. The apparatus of claims 11, 12, 13, 14, 15 or 16 wherein said axially movable pressing means is provided with one of said shearing blade means thereon to force said end faces of said fuse into simultaneous abutting contact with said abutment faces of said shearing blade means prior to operation of said transversely movable pressing means for simultaneous filament removal.

* * * * *